(12) United States Patent
Tatamiya

(10) Patent No.: US 6,450,709 B1
(45) Date of Patent: Sep. 17, 2002

(54) INTERCHANGEABLE FILM BACK TYPE CAMERA

(75) Inventor: Hisashi Tatamiya, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/689,688

(22) Filed: Oct. 13, 2000

(30) Foreign Application Priority Data

Oct. 14, 1999 (JP) .......................................... 11-292208

(51) Int. Cl.⁷ .......................... G03B 17/26; G03B 17/02
(52) U.S. Cl. ...................... 396/513; 396/535; 396/544
(58) Field of Search ................................ 396/354, 355, 396/445, 511, 512, 535, 538, 541, 518, 513

(56) References Cited

U.S. PATENT DOCUMENTS

| | | | | |
|---|---|---|---|---|
| 3,491,671 A | * | 1/1970 | Engeldrum | ................. 396/446 |
| 3,574,296 A | * | 4/1971 | Prochnow et al. | .......... 396/513 |
| 3,638,547 A | * | 2/1972 | Sekida | ....................... 396/391 |
| 4,226,521 A | | 10/1980 | Kawasaki et al. | |
| 4,648,696 A | * | 3/1987 | Park et al. | ................... 396/446 |
| 4,786,929 A | * | 11/1988 | Hamada et al. | .............. 396/283 |
| 5,367,351 A | | 11/1994 | Suzuka | |
| 5,666,579 A | * | 9/1997 | Camello | ..................... 396/323 |
| 6,035,147 A | | 3/2000 | Kurosawa | |

* cited by examiner

Primary Examiner—Alan A. Mathews
(74) Attorney, Agent, or Firm—Greenblum & Bernstein, P.L.C.

(57) ABSTRACT

In a film back adapted to be interchangeably mounted on a camera body, a light-shielding curtain member is installed to cover an aperture. The curtain member is moved by an operating member between first and second positions. At the first position, the aperture is fully covered by the curtain member, while at the second position, the aperture is uncovered. When the film back is mounted on the camera body, a safety lock member prevents detachment of the film back from the camera body in case the curtain member is at the second position, i.e., in case the aperture is uncovered.

21 Claims, 7 Drawing Sheets

INTERCHANGEABLE FILM BACK TYPE CAMERA

BACKGROUND OF THE INVENTION

The present invention relates to an interchangeable film back type camera, and more particularly to a film back adapted to be interchangeably mounted onto a camera body.

An interchangeable-film-back type camera is employed for taking pictures with the different types of films during photographing by replacing a film back carrying one type of a film with other film back carrying other type of a film. A film back to be interchangeably mounted on a camera body is provided with an aperture, through which the photosensitive surface of a film held in a film back faces an aperture formed in a camera body. Further, a film back is provided with a detachable light-shielding plate made of metal for preventing a film from being exposed to light. The light-shielding plate is detached from a film back after a film back is mounted on a camera body and attached again to a film back before a film back is taken away from a camera body.

With the above light-shielding structure of a conventional film back, however, it has been a problem how and where a detached light-shielding plate is to be held, which sometimes resulted in loss or damage thereof.

SUMMARY OF THE INVENTION

It is therefore an object of the present invention to provide an improved film back capable of avoiding the aforementioned problems.

For the above purpose, in accordance with the present invention, there is provided a film back including a light-shielding curtain member which covers an aperture of the film back, and an operating member which moves the curtain member between the first position where the aperture is fully covered and the second position where the aperture is uncovered.

The curtain member is preferably wound on a spool member which is biased to be rotated in a direction to wind up the curtain member for moving the curtain member to the second position.

The operating member may comprise an operating knob secured to the leading end of the curtain member, and mounted on the rear side of the film back to be manually slidable in a limited range. The operating knob is preferable to be fit in an elongated slit formed on the rear side of the film back and extending in the direction of movement of the curtain member with allowing the relative sliding within the length of the slit.

The operating member may be held at the first position by means of a stop member arranged to detachably hold the operating knob at one end of the slit when the operating knob is moved thereto. On the other hand, the operating knob is held at the other end of the slit by the biasing force of the biasing member applied to the curtain member.

In another aspect of the present invention, there is provided an interchangeable film back type camera comprising a camera body and a film back interchangeably mounted on the camera body, which comprises:

a light shielding member provided in the film back to be movable between the first position where an aperture of the film back is fully shielded by the shielding member and the second position where the aperture is not shielded;

a coupling system which detachably couples the film back and the camera body; and a safety lock member which disables detachment of the film back from the camera body in case the light shielding member is at the second position.

The coupling system may comprise:

a first coupling structure for pivotally coupling one side end of the film back and the corresponding side end of the camera body while allowing relative rotation; and a second coupling structure including a lug member and a hook member, the hook member being moved for detachably engaging the lug member, one of the lug member and the hook member being provided at the other side end of the camera body while the other one is at the corresponding side end of the film back.

In the above constituted camera, the film back is coupled to the camera body at one side end thereof by the first coupling structure, and at the other side end by engaging the hook member with the lug member. Further, the safety lock member disables the movement of the hook member so as to prevent the hook member from being disengaged from the lug member.

The first coupling structure may comprise a pair of a pivot shaft member and a resilient hook member for detachably holding the pivot shaft while allowing relative rotation thereof, one of which is provided at the one side end of the camera body while the other one is at the corresponding side end of the film back.

The safety lock member preferably comprises an arm lever, one end of which faces the area where the hook member is moved while the other end faces the area where the light shielding member is moved, when the film back is mounted to the camera body. The arm lever should be arranged to be movable between the operative position where the arm lever intersects the area of the movement of the hook member and the retracted position where the arm lever does not intersect.

Further, the arm lever may be biased to move toward the operative position, and the one end of the arm lever is arranged to be moved toward the retracted position against the biasing force in case the light shielding member is at the first position thereof for allowing movement of the hook member to be disengaged from the lug member.

DESCRIPTION OF THE ACCOMPANYING DRAWINGS

DESCRIPTION OF THE EMBODIMENTS

An interchangeable film back embodying the invention will be described here after by referring to the accompanying drawings.

Figure 1:
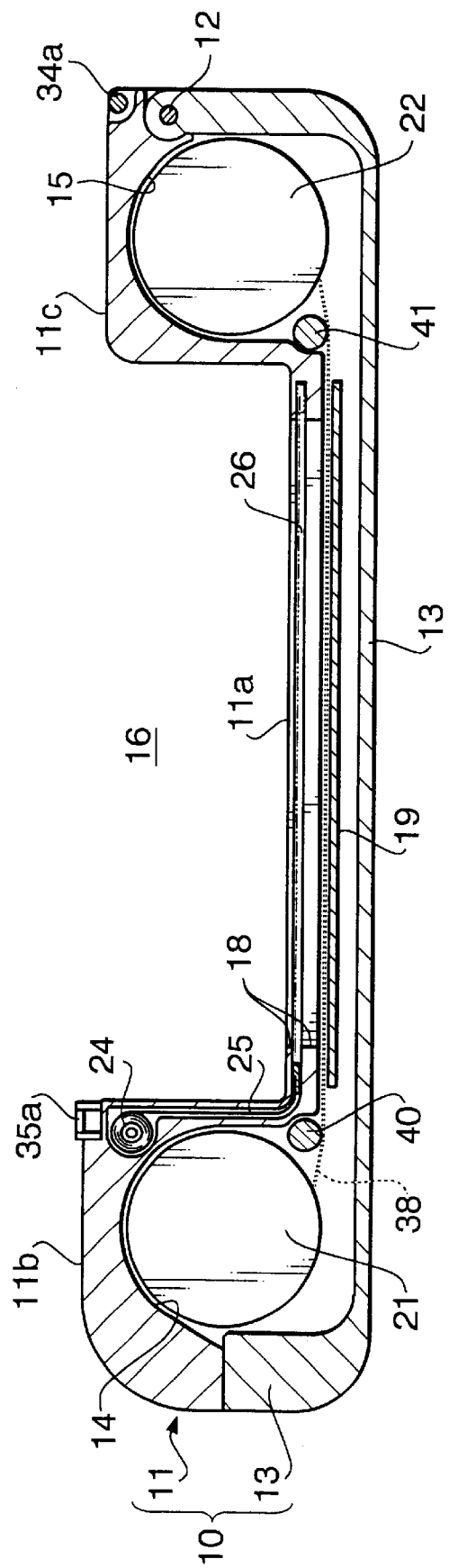
FIG. 1 is a cross sectional plan view, taken along lines I—I of FIG. 2, of an exchangeable film back embodying the invention.
Figure 2:
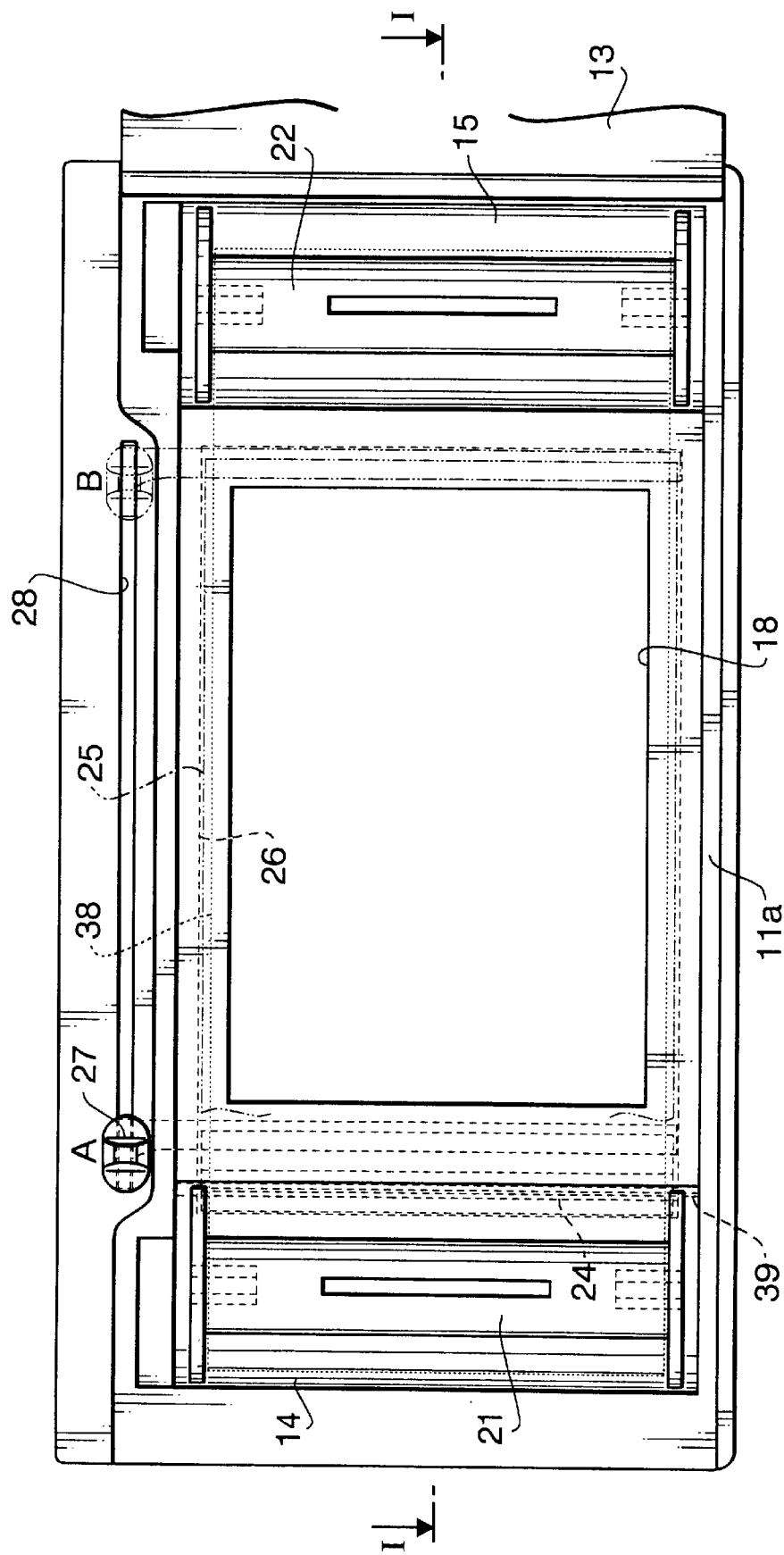
FIG. 2 is a rear view thereof.
Figure 3:
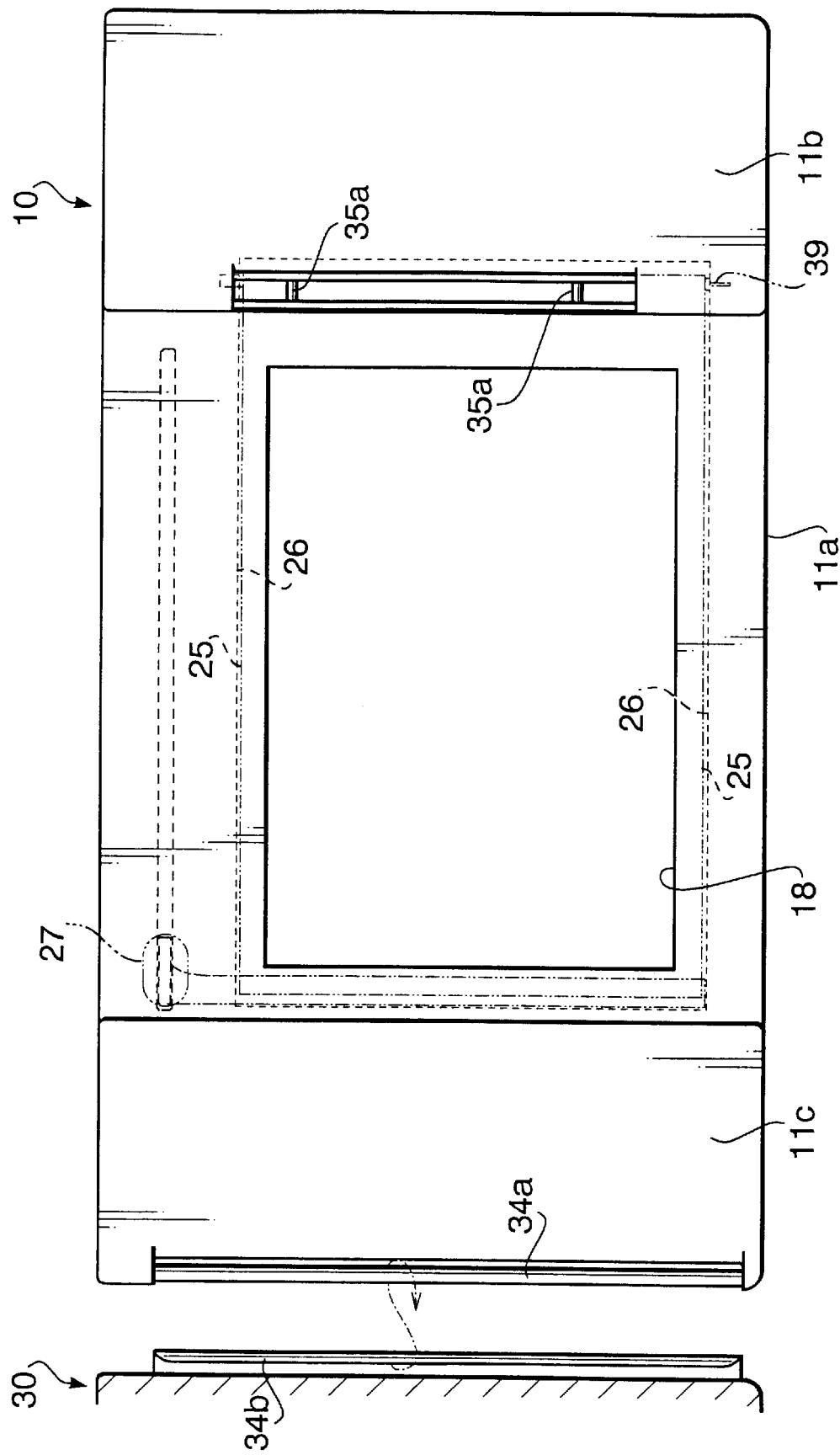
FIG. 3 is a front view thereof.

As shown in FIGS. 1 through 3, an interchangeable film back 10 comprises a front case 11 and a rear cover 13 swingably pivoted to the case 11 at one end thereof by a pivot shaft 12.

Figure 4:
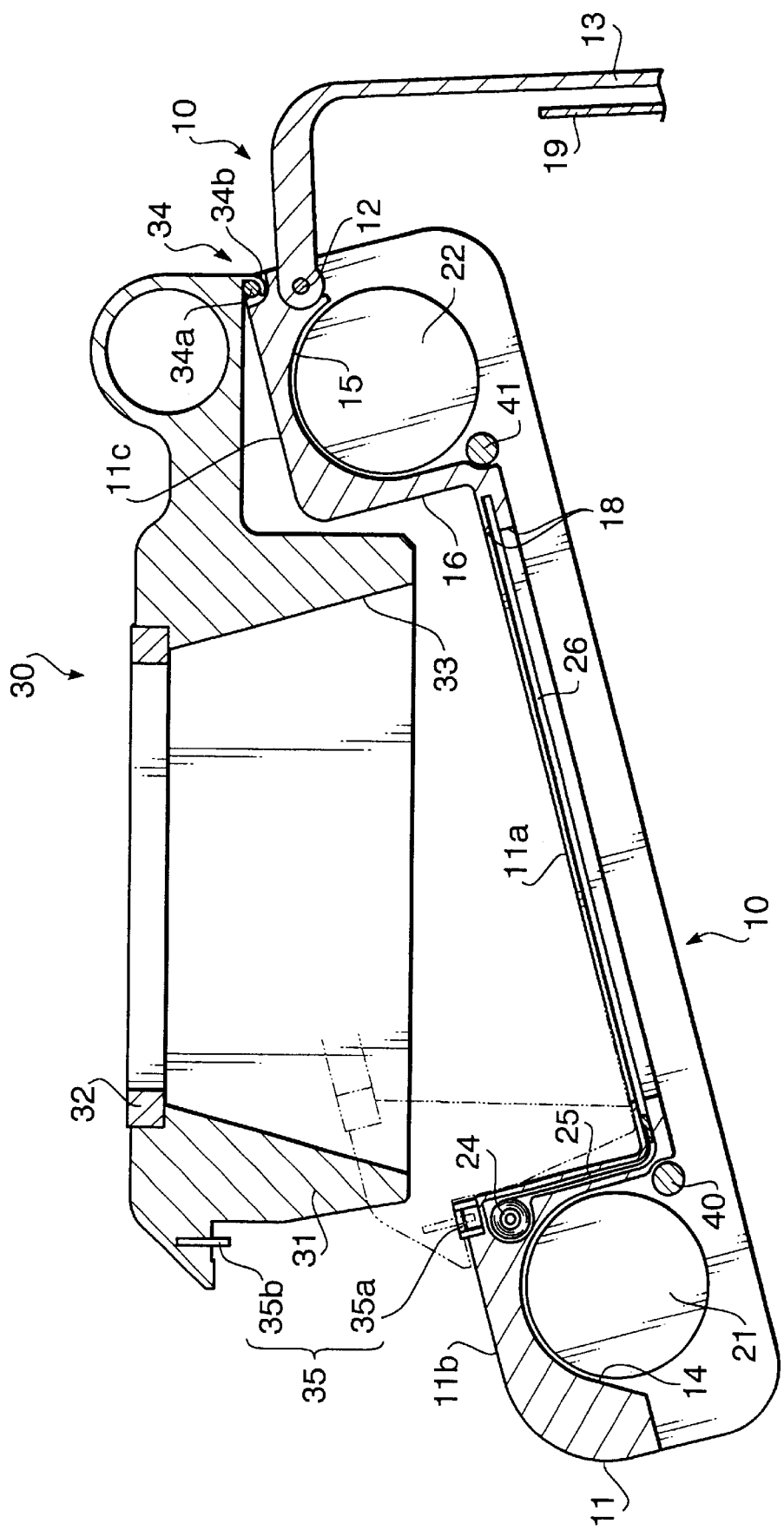
FIG. 4 is a cross sectional plan view of the film back pivoted on a camera body at one side end thereof by means of a first coupling mechanism.

The front case 11 comprises a flat wall portion 11a and a pair of inverted-L shaped wall portions 11b and 11c integrally extended from the respective ends of the flat wall portion 1a, which forms an external recess 16 for receiving therein an aperture protrusion 31 of a camera body 30 (see FIG. 4).

The rear cover 13 is of the U-shaped sectional figure and biased by a torsion spring, not shown, to swing about the shaft 12 such that the other end of the rear cover 13 is forced to contact the other end of the front case 11 to form a closed inner space between the front case 11 and the rear cover 13.

A rectangular aperture 18 is formed on the flat wall portion 11a so as to face an aperture 33 of the camera body 30 (see FIG.4) when the film back 10 is mounted to the camera body 30.

A film spool chamber 14 and a take-up spool chamber 15 are formed between the rear cover 13 and the inverted L-shaped wall portions 11b and 11c, respectively. Further, a press plate 19 is provided to the inner surface of the rear cover 13 to be resiliently pressed toward an outer rail, not shown, provided to the inner surface of the flat wall portion 11a to form a film feeding path between the press plate 19 and an inner rail, not shown, also provided to the inner surface of the flat wall portion 11a, as well known in the art.

A film 38 is to be taken out of a film spool 21 placed in the film spool chamber 14 to be taken up by a take-up spool 22 placed in the take-up spool chamber 15 through the film feeding path with the photosensitive surface thereof facing the aperture 18 of the flat wall portion 11a. Reference numerals 40 and 41, respectively, represent guide rollers for guiding the film 38 being transferred.

Within the thickness of the front case 11, a light-shielding curtain member 25 is arranged. The curtain member 25 is made of a flexible material and wound on a spool shaft 24 housed in a spool space formed in the thickness of the wall portion 11b. The spool shaft 24 is biased, as later described, to rotate in the direction to wind up the curtain member 25. A slit space 26 extending from the spool space over the aperture 18 is formed within the thickness of the wall portions 11b and 11a for allowing the curtain member 25 to be slid therein.

Figure 7:
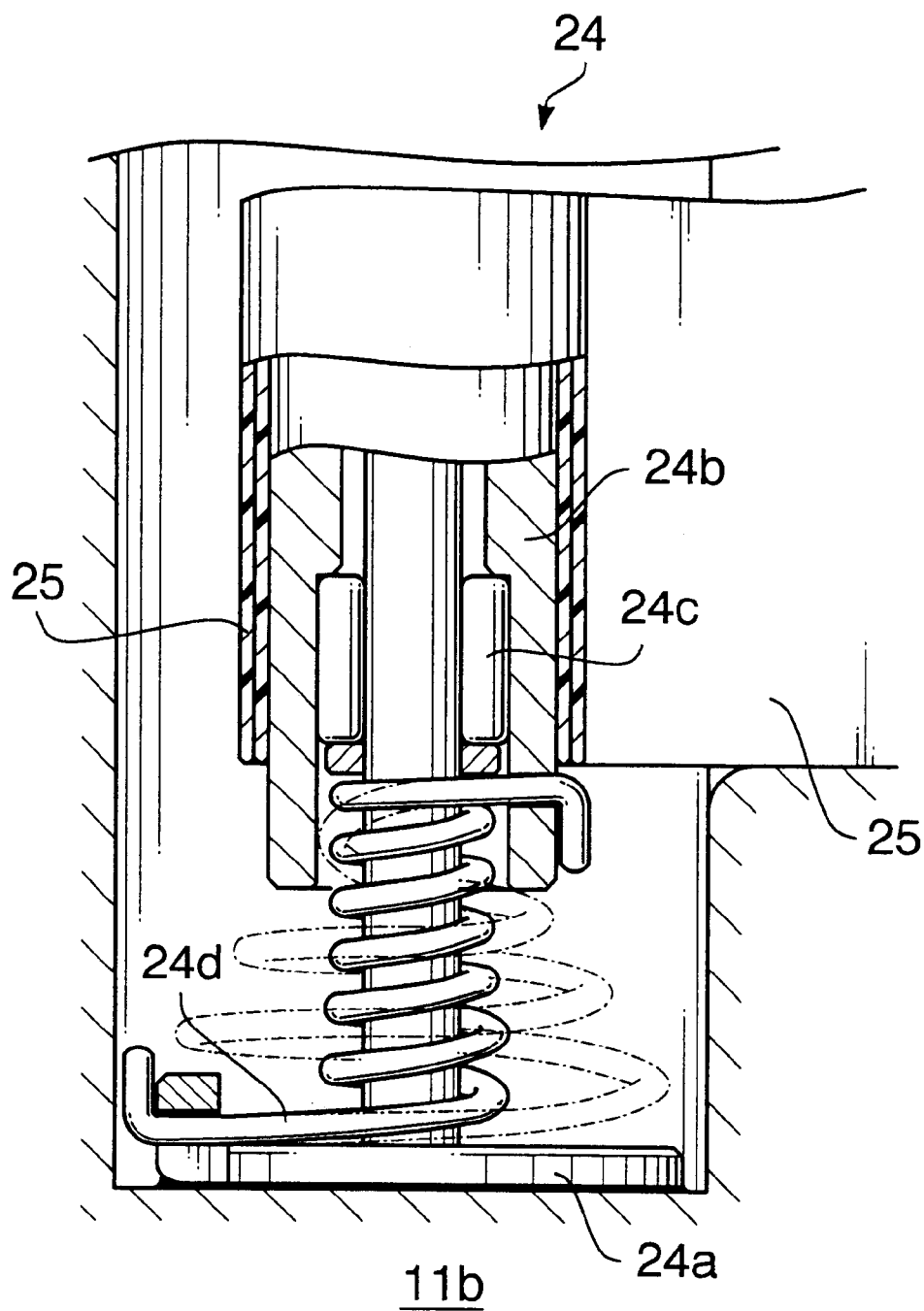
FIG. 7 is a partial sectional view showing a spool shaft on which a light shielding curtain is wound.

As illustrated in FIG. 7, the spool shaft 24 comprises a support shaft member 24a, a spool member 24b rotatably mounted on the support shaft member 24a via bearings 24c, and a spring 24d wound on the support shaft member 24a, one end of the spring 24d is anchored to the wall portion 11b while the other is to the spool member 24b to bias the spool member 24b to rotate in the direction to wind up the curtain member 25.

An operating knob 27 is secured to the upper side of the leading end of the curtain member 25, as shown in FIG. 2, via a lug portion 27a thereof (see FIG. 5) and is slidably fit in a laterally extending guide groove 28 formed on the rear upper surface of the front case 11. As the rear upper surface of the front case 11 is not overlapped with the rear cover 13, the operating knob 27 is manually accessible even under the state that the rear cover 13 is closed.

Normally, the operating knob 27 is positioned at A (solid line position) by the winding force of the spool shaft 24, where the aperture 18 is fully open for allowing light to pass therethrough to expose the film 38. By manually moving the operating knob 27 along the guide groove 28 to be positioned at B (double-dotted line position), the aperture 18 is fully closed to prevent the film 38 from being exposed to light. A well-known click stop 100 (see FIG. 5) is provided at the right-side end, in FIG. 2, of the guide groove 28 to hold the operating knob 27 at the position B against the winding force of the spool shaft 24.

In order to smoothly move the leading end of the curtain member 25 upon movement of the operating knob 27, it is preferable to increase the stiffness of the leading end portion of the curtain member 25 or to attach a reinforcing material thereto.

The above constituted film back 10 is detachably connected to the camera body 30 as illustrated in FIG. 4. The camera body 30, in this embodiment, comprises the aperture protrusion 31, through which the aperture 33 is formed, and a circular lens mount 32, on which a photographing lens is to be mounted, is secured to the outer end of the aperture 33.

One end of the film back 10 is coupled to the corresponding end of the camera body 30 by a first coupling mechanism 34, while the other end of the film back 10 is securely held by the corresponding other end of the camera body 30 by a second coupling mechanism 35.

The first coupling mechanism 34 is constituted by a pivot shaft 34a provided to the film back 10 and a resilient hook-plate member 34b provided to the camera body 30 to detachably hold the pivot shaft 34a.

Figure 6:
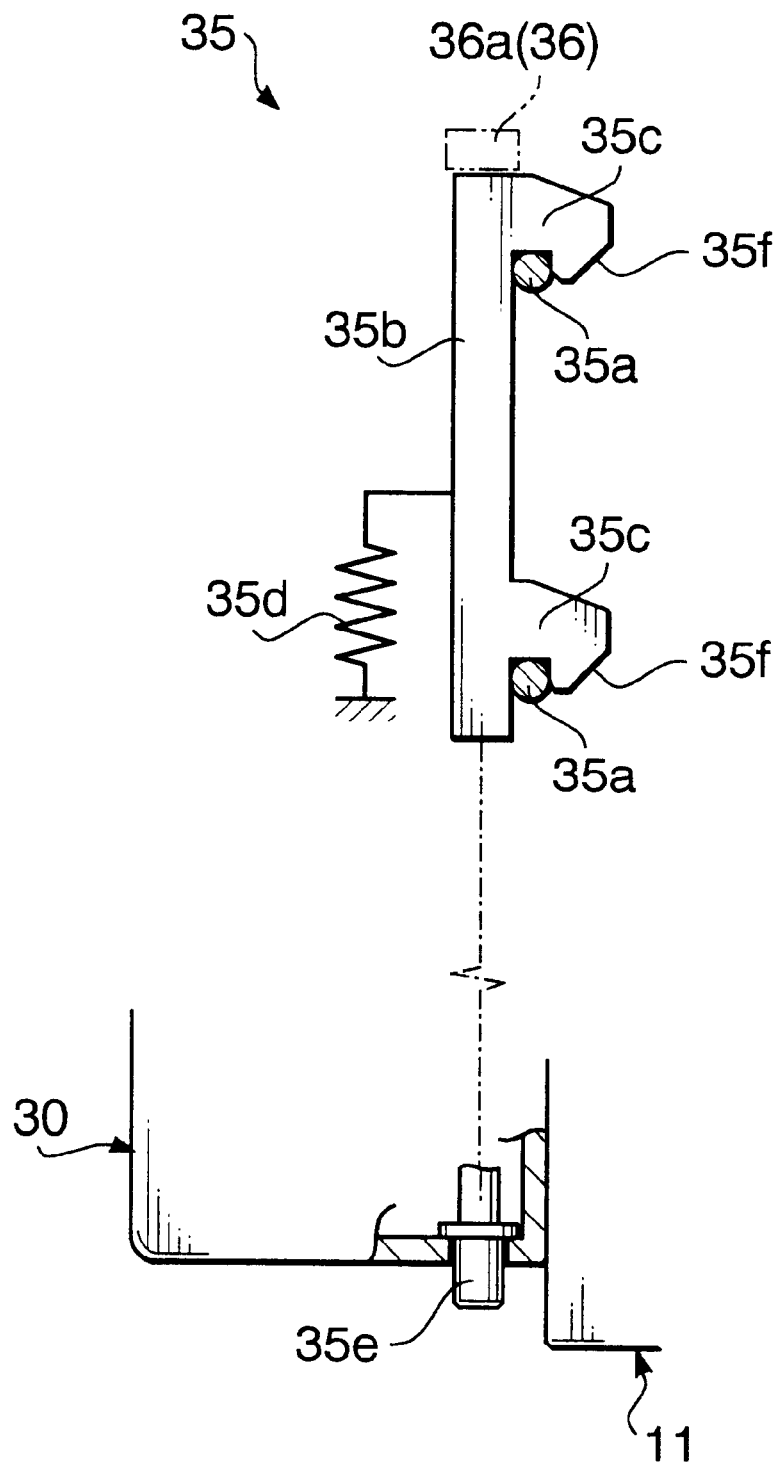
FIG. 6 is an explanatory view showing the relationship among a lug member, a hook member and a safety lever.

The second mechanism 35 is constituted, as illustrated in detail in FIG. 6, by a pair of lug pins 35a laterally arranged at a predetermined vertical interval on the film back 10, and a hook plate 35b vertically movably mounted on the camera body 30 to be engaged with the lug pins 35a. The hook plate 35b is formed with a pair of hook members 35c being vertically spaced at the interval corresponding to the interval of the lug pins 35a, and is biased by a spring 35d in the direction to engage the lug pins 35a (downward in FIG. 6). The reference numeral 35e represents a push button coupled to the bottom of the hook plate 35b and externally protruded from the bottom surface of the camera body 30 to be manually operated. By depressing the button 35e toward inside the camera body 30, the hook plate 35b is moved upwardly against the biasing force of the spring 35d so that the hook members 35c are disengaged from the lug pins 35a. Accordingly, by operating the push button 35e, after the pivot shaft 34a of the film back 10 is coupled to the hook-plate member 34b of the camera body 30, the hook plate 35b engages the lug pins 35a to securely hold the film back 10 in the closed state after the push button 35e is released.

It should be noted here that the push button 35e can be omitted if the biasing force of the spring 35d is so set as to enable the lug pins 35a push up the hook plate 35b against the biasing force of the spring 35d by sliding contact with the tapered surfaces 35f of the hook members 35c when the film back 10 approaches the camera body 30 to be coupled by means of the second coupling mechanism 35.

Figure 5:
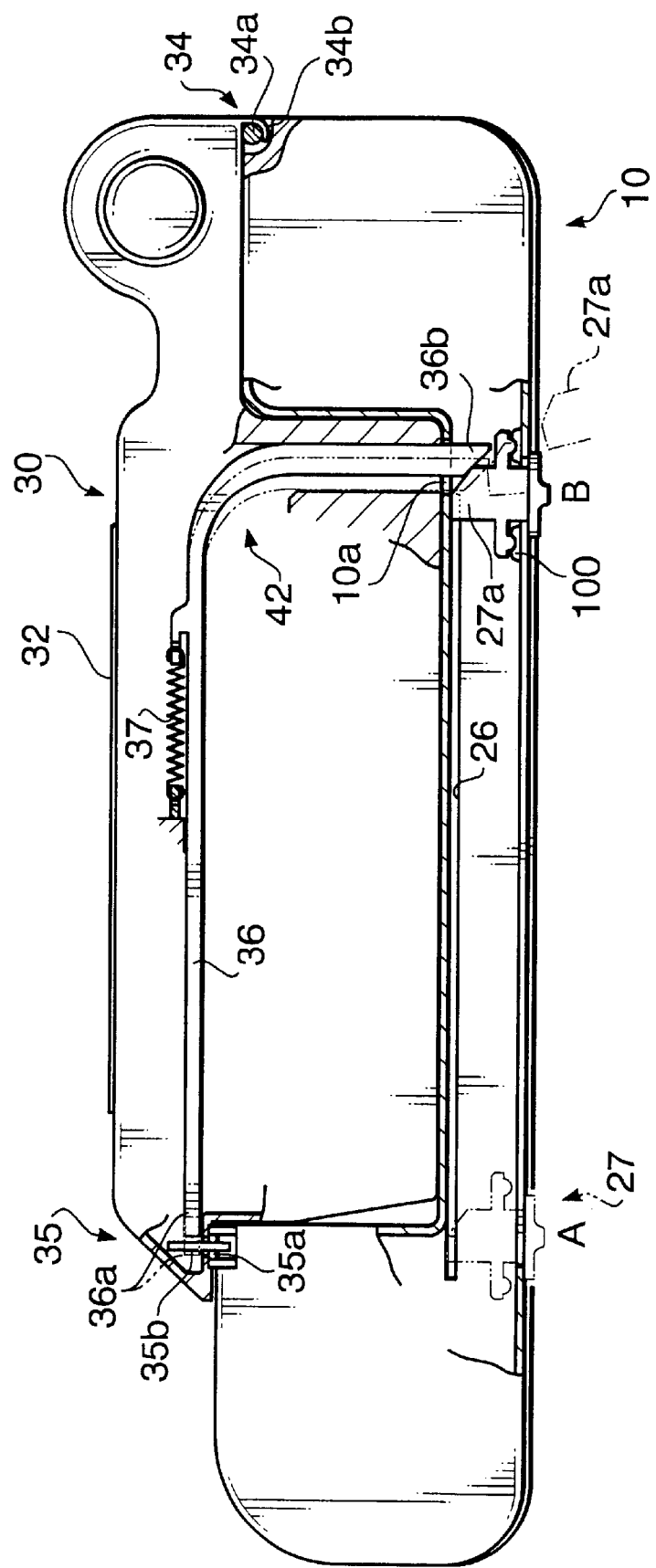
FIG. 5 is a plan view showing a second coupling mechanism as well as a safety lock mechanism constituted when the film back is completely mounted on the camera body.

The above constituted second coupling mechanism 35 also functions as a safety mechanism for light shielding in cooperation with a safety lever 36 provided to the upper portion of the camera body 30, as shown in FIGS. 5 and 6.

That is, the safety lever 36 of an inverted-L shape is arranged within the thickness of the upper portion of the camera body 30 such that one end 36a thereof reaches above the hook plate 35b, while the other end 36b is protruded outwardly from the camera body 30 when the film back 10 is not mounted on the camera body 30. Further, the safety lever 36 is supported to be movable between the position illustrated by a solid line and the position illustrated by a double-dotted line in FIG. 5, while biased toward the position illustrated by a double-dotted line by means of a spring 37. At the double-dotted line position, the one end 36a of the safety lever 36 prevents the upward movement of the hook plate 35b. While at the solid line position, the one end 36a of the safety lever 36 is retracted from the space above the hook plate 35b and allows the latter to be upwardly moved.

On the other hand, a lateral slit 10a is formed on the film back 10 to allow the other end 36b of the safety lever 36 to pass therethrough when the film back 10 is mounted to the camera body 30 and to face the area where the operation knob 27 is positioned to shield the aperture 18 by the curtain member 25. The other end 36b of the safety lever 36 is formed to have a slope to be slidably contacted by the lug portion 27a of the operating knob 27 so that the safety lever 36 is moved toward the solid line position against the biasing force of the spring 37 by means of the lug portion 27a of the operating knob 27 when the film back 10 is mounted to the camera body 30. Then, by moving the operating knob 27 toward the position A of FIG. 2 for preparation of photographing, the safety lever 36 is moved to the double-dotted line position of FIG. 5 by the biasing force of the spring 37, and the upward movement of the hook plate 35b is prevented until the operating knob 27 is again moved to the position B of FIG. 2 to shield the aperture 18 by the curtain member 25, where the safety lever 36 is returned to the solid line position of FIG. 5 by means of the lug portion 27a of the operating knob 27 against the biasing force of the spring 37.

Thus, it can be prevented that the film back 10 is detached from the camera body 30 without light-shielding the aperture 18 by the curtain member 25.

When taking pictures by employing the above constituted film back 10, the previously mounted film back is taken away from the camera body 30 and another film back 10 is mounted onto the camera body 30. It should be noted that the operating knob 27 of the film back 10 is kept at the position B where the aperture 18 is fully covered by the curtain member 25 when the film back 10 is not mounted onto the camera body 30.

First, the pivot shaft 34a of the film back 10 is fit into the resilient hook-plate member 34b of the camera body 30 to be relatively rotatably held thereby, and then, the film back 10 is swung about the pivot shaft 34b in the clockwise direction in FIG. 4. During this approach of the film back 10 to the camera body 30, the lug portion 27a of the operating knob 27 of the film back 10 slidingly contacts the outer end 36b of the safety lever 36 protruded out of the camera body 30 and presses it to be moved rightward in FIG. 5 against the biasing force of the spring 37, so that the inner end 36a of the safety lever 36 retracts from the area where it intersects the upward movement of the hook plate 35b.

Then, the push button 35e at the bottom of the camera body 30 is manually operated to upwardly move the hook plate 35b and hold it there. Under this state, the film back 10 is swung to completely contact the camera body 30 as illustrated in FIG. 5, and then the pressing force applied to the push button 35e is released so that the hook plate 35b is downwardly moved by the biasing force of the spring 35d to be engaged with the lug pins 35a of the film back 10, as illustrated in FIG. 6, whereby the film back 10 is securely coupled to the camera body 30.

Here, the manual force is applied to the operating knob 27 of the film back 10 to move it leftwardly in FIG. 5, which causes the operating knob 27 released from the click stop 100 and moved toward the position A (FIG. 2) by the winding force of the spool shaft 24, whereby the aperture 18 is uncovered to allow the film 38 situated behind it to be exposed to light coming through the aperture 33 of the camera body 30.

Under the above state, as the operating knob 27 is away from the area to contact the outer end 36b of the safety lever 36, the safety lever 36 is moved to the position illustrated by the double-dotted line in FIG. 5 by the biasing force of the spring 37, where the inner end 36a of the safety lever 36 is placed in the area intersecting the upward movement of the hook plate 35b, whereby the release of the film back 10 from the camera body 30 by intentionally or accidentally operating the push button 35e is prevented.

On the other hand, when the film back 10 is taken away from the camera body 30, the operating knob 27 is to be manually moved, first of all, toward the position B(FIG. 2) against the winding force of the spool shaft 24 until the operating knob 27 is fit into the click stop 100 and kept there. Thereby, the aperture 18 of the film back 10 is fully covered by the curtain member 25 for light-shielding, and the safety lever 36 is moved toward the position illustrated by the solid line in FIG. 5 to allow the manual operation of the push button 35e.

Then, the steps are to be taken in reverse order of those explained here in above for mounting the film back 10 onto the camera body 30.

As above described, as the interchangeable film back 10 embodying the invention employs the flexible curtain member 25 accommodated in the film back 10 as a light-shielding member, instead of the conventionally employed light-shielding member which is a separate member made of metal and detached from the film back when the film back is mounted to the camera body, it can be prevented that the light-shielding member is lost or damaged.

Further, with the above explained interchangeable film back type camera, as the positioning of the operating knob 27, which moves the curtain member 25 toward and away form the light-shielding position, is linked to the positioning of the safety lever 36, which disables the release of the film back 10 from the camera body 30, it can be prevented that the film back 10 is mistakenly taken away from the camera body 30 without light-shielding the aperture 18 of the film back 10.

In the meantime, it should be noted that, although a shutter mechanism and other well-known elements necessary to take pictures are installed in the camera body 30, descriptions as well as illustrations thereof are omitted in the specification and the accompanying drawings.

The present disclosure relates to the subject matter in Japanese Patent Application No. Hei 11-292208 filed on Oct. 14, 1999, which is expressly incorporated herein by reference in its entirety.

What is claimed is:

1. A film back adapted to be interchangeably mounted on a camera body, said film back being provided with an aperture formed to face an aperture of the camera body when the film back is mounted to the camera body, which comprises:

a light-shielding curtain member which covers said aperture of the film back;

an operating member which moves said curtain member between the first position where said aperture is fully covered and the second position where said aperture is uncovered, and a spool member on which said curtain member is windable to move said curtain member to said second position.

2. The film back according to claim 1, which further comprises:
   a device that rotates said spool member in a direction to wind up said curtain member for moving said curtain member to said second position.

3. The film back according to claim 2, wherein said device that rotates said spool member comprises:
   a biasing member which biases said spool member to be rotated in a direction to wind up said curtain member for moving said curtain member to said second position.

4. The film back according to claim 3, wherein said operating member comprises an operating knob secured to the leading end of said curtain member, said operating knob being mounted on the rear side of the film back to be manually slidable in a limited range.

5. The film back according to claim 4, which further comprises an elongated slit formed on the rear side of the film back and extending in the direction of movement of said curtain member, said operating knob being slidably fit in said slit while limiting the sliding movement of the operating knob to the length of the slit, and wherein said curtain member is at the first position when said operating knob is positioned at one end of said slit while at the second position when at the other end of the slit.

6. The film back according to claim 5, which further comprises a stop member which detachably holds said operating knob at said one end of the slit when the operating knob is moved thereto, and wherein said operating knob is held at said other end of the slit by the biasing force of said biasing member applied to the curtain member.

7. An interchangeable film back type camera comprising a camera body and a film back interchangeably mounted on said camera body, said film back having an aperture which faces an aperture of the camera body, which comprises:
   a light shielding member provided in said film back to be movable between the first position where said aperture is fully shielded by said shielding member and the second position where said aperture is not shielded;
   a coupling system which detachably couples said film back and said camera body; and
   a safety lock member which disables detachment of said film back from said camera body in case said light shielding member is at said second position;
   wherein said coupling system comprises:
      a first coupling structure for pivotally coupling one side end of said film back and the corresponding side end of said camera body by allowing relative rotation;
      a second coupling structure including a pair of a lug member and a hook member, said hook member being moved for detachably engaging said lug member, one of said lug member and said hook member being provided at the other side end of said camera body while the other one is provided at the corresponding side end of said film back;
      wherein said film back is coupled to said camera body at one side end thereof by said first coupling structure, and at the other side end by engaging said hook member with said lug member, and
      wherein said safety lock member disables the movement of said hook member so as to prevent the hook member from being disengaged from the lug member.

8. The camera according to claim 7, wherein said first coupling structure comprises a pair of a pivot shaft member and a resilient hook member for detachably holding said pivot shaft with allowing relative rotation thereof, one of which is provided at said one side end of the camera body while the other one at the corresponding side end of the film back.

9. The camera according to claim 7,
   wherein said safety lock member comprises an arm lever, one end of which faces the area where said hook member is moved while the other end faces the area where said light shielding member is moved when said film back is mounted to said camera body, said arm lever being arranged to be movable between the operative position where the arm lever intersects the area of the movement of the hook member and the retracted position where the arm lever does not intersect, said arm lever being biased to move toward the operative position, and
   wherein said one end of the arm lever is moved toward the retracted position against the biasing force in case said light shielding member is at the first position thereof for allowing movement of the hook member to be disengaged from the lug member.

10. The camera according to claim 9, which further comprises an operating member secured to the leading end of said light shielding member, said operating member being mounted on the rear side of the film back to be manually slidable in a limited range, and wherein said other end of said arm lever contacts said operating member to be moved toward the first position.

11. An interchangeable film back type camera comprising a camera body and a film back interchangeably mounted on said camera body, said film back being provided with an aperture formed to face an aperture of the camera body when the film back is mounted to the camera body, which comprises:
   a curtain member provided in said film back to cover said aperture of the film back for light-shielding;
   an operating member provided in said film back for moving the curtain member between the first position where said aperture is fully covered and the second position where said aperture is uncovered; and
   a spool member on which said curtain member is windable to move said curtain member to said second position.

12. The camera according to claim 11, which further comprises:
   a device that rotates said spool member in a direction to wind up said curtain member for moving said curtain member to said second position.

13. The camera according to claim 12, wherein said device that rotates said spool member comprises:
   a biasing member which biases said spool member to be rotated in a direction to wind up said curtain member for moving said curtain member to said second position.

14. The camera according to claim 13, wherein said operating member comprises an operating knob secured to the leading end of said curtain member, said operating knob being mounted on the rear side of the film back to be manually slidable in a limited range.

15. The camera according to claim 14, which further comprises an elongated slit formed on the rear side of the film back and extending in the direction of movement of said curtain member, said operating knob being slidably fit in said slit with limiting the sliding movement of the operating knob to the length of the slit, and wherein said curtain member is at the first position when said operating knob is positioned at one end of said slit while at the second position when at the other end of the slit.

16. The camera according to claim 15, which further comprises a stop member which detachably holds said operating knob at said one end of the slit when the operating knob is moved thereto, and wherein said operating knob is held at said other end of the slit by the biasing force of said biasing member applied to the curtain member.

17. The camera according to claim 15, which further comprises:
   a coupling system which detachably couples said film back and said camera body; and
   a safety lock member which disables detachment of said film back from said camera body in case said operating member is at said second position.

18. The camera according to claim 17, wherein said coupling system comprises:
   a first coupling structure for pivotally coupling one side end of said film back and the corresponding side end of said camera body with allowing relative rotation; and
   a second coupling structure including a lug member provided at the other side end of said film back and a hook member provided at the corresponding side end of said camera body, said hook member being moved for detachably engaging said lug member,
   wherein said film back is coupled to said camera body at one side end thereof by said first coupling structure, and at the other side end by engaging said hook member with said lug member, and
   wherein said safety lock member disables the movement of said hook member so as to prevent the hook member from being disengaged from the lug member.

19. The camera according to claim 18, wherein said first coupling structure comprises a pair of a pivot shaft member provided at said one side end of the film back and a resilient hook member provided at the corresponding side end of the camera body for detachably holding said pivot shaft while allowing relative rotation thereof.

20. The camera according to claim 18,
   wherein said safety lock member comprises an arm lever, one end of which faces the area where said hook member is moved while the other end faces the area where said operating member is moved when said film back is mounted to said camera body, said arm lever being arranged to be movable between the operative position where the arm lever intersects the area of the movement of the hook member and the retracted position where the arm lever does not intersect, said arm lever being biased to move toward the operative position, and
   wherein said one end of the arm lever is moved toward the retracted position against the biasing force in case said operating member is at the first position thereof for allowing movement of the hook member to be disengaged from the lug member.

21. The camera according to claim 20, wherein said other end of said arm lever is protruded out of said camera body to be received in said film back, when the latter is mounted to the camera body, so as to face the area of movement of said operating member.

* * * * *